(12) United States Patent
Kliman et al.

(10) Patent No.: US 6,396,188 B1
(45) Date of Patent: May 28, 2002

(54) SALIENT POLE SYNCHRONOUS MACHINE ROTOR INCLUDING CONTINUOUSLY EXTENDING END PLATES

(75) Inventors: Gerald Burt Kliman, Niskayuna; Manoj Ramprasad Shah, Latham, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/535,795

(22) Filed: Mar. 28, 2000

(51) Int. Cl.$^7$ ................................................. H02K 5/16
(52) U.S. Cl. ........................ 310/217; 310/91; 310/269
(58) Field of Search .............................. 310/261, 269, 310/89, 91, 218, 265

(56) References Cited

U.S. PATENT DOCUMENTS

| | | | | |
|---|---|---|---|---|
| 3,831,268 A | * | 8/1974 | Boyd et al. .................... 29/598 |
| 4,161,669 A | * | 7/1979 | Aimar ......................... 310/194 |
| 5,053,666 A | * | 10/1991 | Kliman et al. ............... 310/261 |
| 5,436,519 A | * | 7/1995 | Takahashi et al. ........... 310/217 |
| 5,463,262 A | * | 10/1995 | Uchida ........................ 310/156 |
| 5,739,615 A | * | 4/1998 | McClelland ................. 310/186 |

OTHER PUBLICATIONS

M. Liwschitz–Garik, Et Al, Alternating–Current Machines (2nd Ed 1961) 1 Page.
Ralph R. Lawrence "Principles of Alternating–Current Machinery" (Henry E. Richards Reviser, 4th Ed. 1953), p. 333.

* cited by examiner

Primary Examiner—Tran Nguyen
(74) Attorney, Agent, or Firm—Ann M. Agosti; Jill M. Breedlove

(57) ABSTRACT

A salient pole synchronous machine rotor includes a rotor shaft; a plurality of salient poles concentric to the rotor shaft; and end plates facing opposing ends of the salient poles, each end plate extending continuously around the rotor shaft.

27 Claims, 11 Drawing Sheets

SALIENT POLE SYNCHRONOUS MACHINE ROTOR INCLUDING CONTINUOUSLY EXTENDING END PLATES

BACKGROUND

The invention relates generally to salient pole synchronous machines and more particularly to rotors of salient pole synchronous machines.

Figure 1:
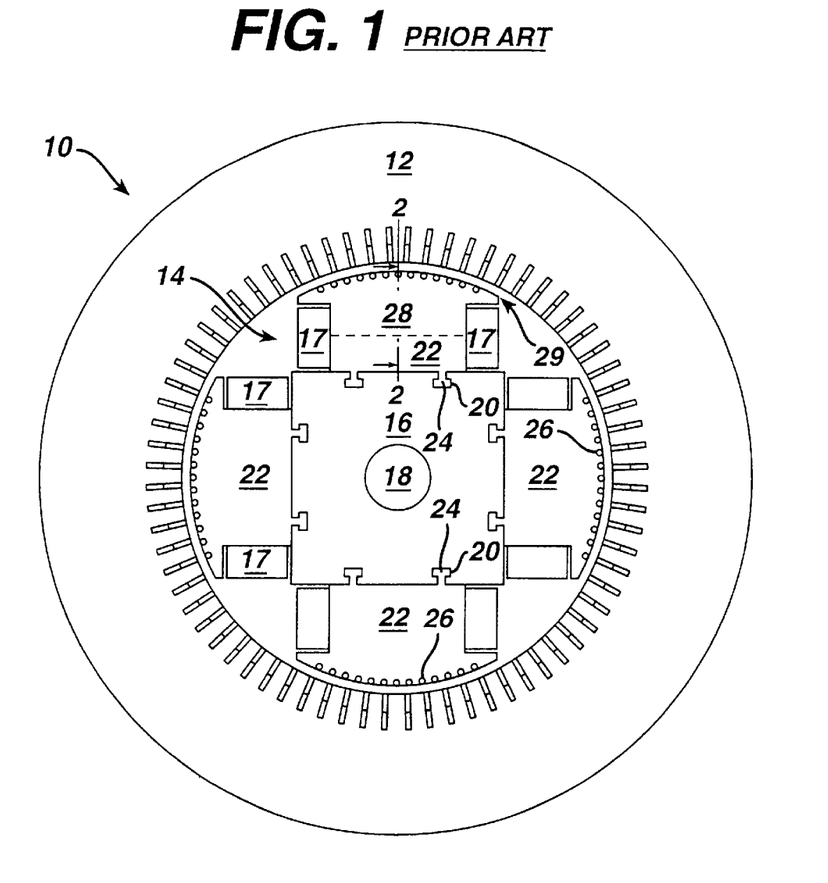
FIG. 1 is an end view of a conventional salient pole synchronous rotor schematically showing an end plate segment on one of the poles.
Figure 2:
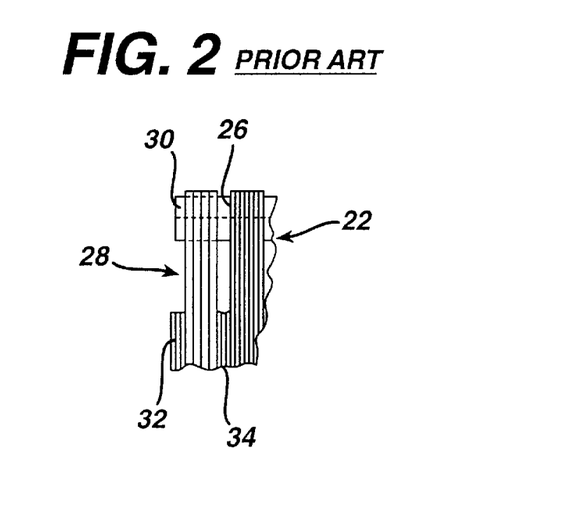
FIG. 2 is a sectional side view along line 2—2 of FIG. 1.

A conventional large salient pole synchronous machine 10 including a stator 12 and a rotor 14 is shown in FIG. 1, and a sectional view of a portion of the rotor is shown in FIG. 2. Examples of conventional salient pole synchronous rotors are shown, for example, in MICHAEL LIWSCHITZ-GARIK & CLYDE C. WHIPPLE, ALTERNATING-CURRENT MACHINES (2d ed. 1961) and RALPH R. LAWRENCE, PRINCIPLES OF ALTERNATING-CURRENT MACHINERY (Henry E. Richards reviser, $4^{th}$ ed. 1953). In these rotors, end plates 28 typically comprise copper sheets that are shaped to match the profiles of poles 22. Each end plate extends about half-way down the pole and is clamped between supports 32 and 34 which typically comprise shortened steel laminations that permit bending of the end plates and thus allow axial movement of rotor bars 30 (situated in bar holes 26 and electrically coupled to the end plates to form a rotor cage) to accommodate thermal expansion and contraction.

When such machines are driven by electronic converters, considerable harmonic current results in the rotor bars and rotor core and leads to increased heat burdens. During normal operation, because the rotor bar cage is interrupted in the span regions between the poles, rotor bars near pole ends 29 carry more current than the other bars and are more prone to failure. Additionally, harmonic flux penetrates into the rotor core 16, rotor key slots 20, pole keys 24, shaft 18, and rotor windings 17 and creates destructive currents there.

BRIEF SUMMARY

It would therefore be desirable to provide a salient pole synchronous machine rotor with reduced concentration of currents in rotor bars situated near the pole ends. It would additionally be desirable to reduce induction of destructive currents in the rotor core, key slots, pole keys, shaft and windings.

Briefly, in accordance with one embodiment of the present invention, a salient pole synchronous machine rotor comprises a rotor shaft, a plurality of salient poles concentric to the rotor shaft, and end plates facing opposing ends of the salient poles with each end plate extending continuously around the rotor shaft.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF THE INVENTIONS

As stated above, in one embodiment of the present invention, a salient pole synchronous machine rotor 14 comprises a rotor shaft 18, a plurality of salient poles 22 concentric to the rotor shaft (shown and described with respect to FIG. 1 above), and end plates facing opposing ends of the salient poles with each end plate extending continuously around the rotor shaft (shown and described with respect to FIGS. 3–20 below). Extending the end plates continuously around the rotor shaft ameliorates the pole end bar current concentration and partially shields the interior of the rotor from harmonic effects.

Figure 3:
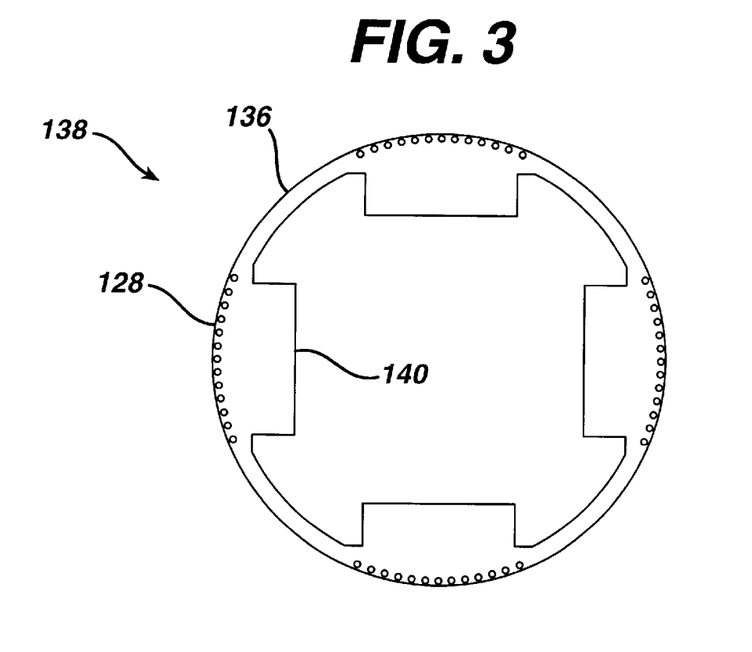
FIGS. 3–4 are an end views of end plates according to several embodiments of the present invention.
Figure 4:
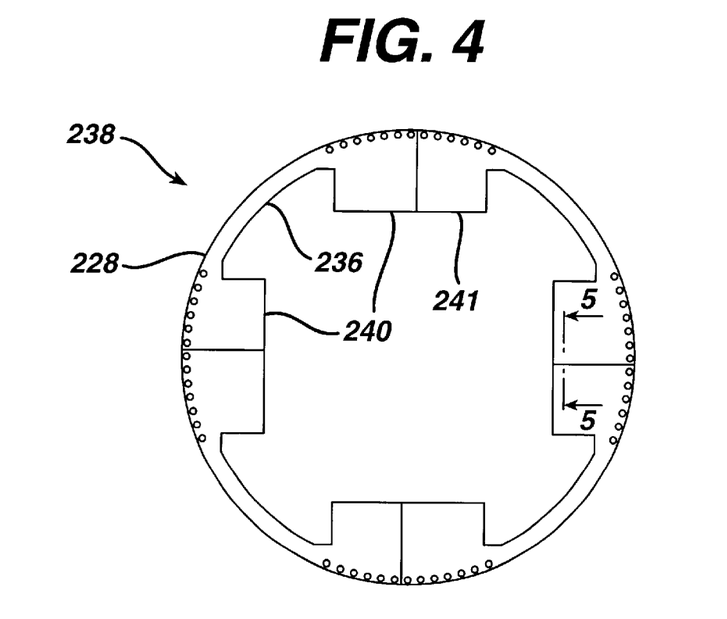
Figure 5:
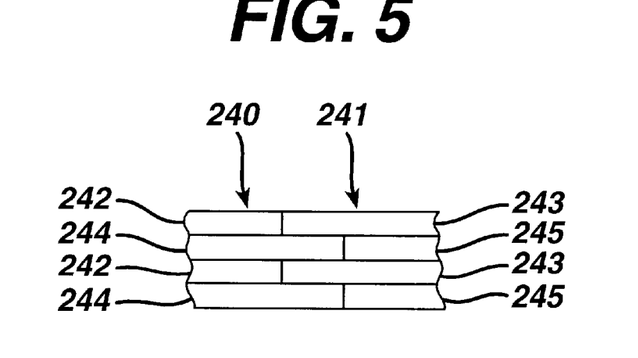
FIG. 5 is a sectional side view along line 5—5 of FIG. 4.
Figure 6:
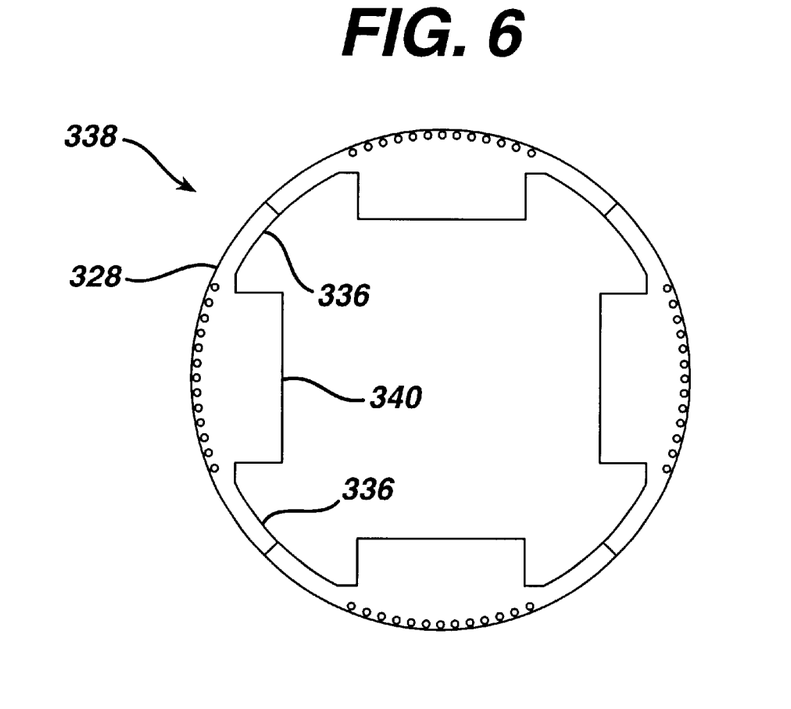
FIG. 6 is an end view of an end plate according to another embodiment of the present invention.

FIGS. 3–4 are end views of end plates according to several embodiments of the present invention, FIG. 5 is a sectional side view along line 5—5 of FIG. 4, and FIG. 6 is an end view of an end plate according to another embodiment of the present invention. In one embodiment, for example, the end plates include about 3–6 laminations which are brazed or clamped together, for example, and have a thickness of about 3.175 millimeters (⅛ inch).

In FIG. 3, end plates 138 may comprise a plurality of integral copper laminations, for example. Due to the fact that punching single piece end plate laminations may result in wasted materials and difficult assembly processes, embodiments such as shown in FIGS. 4 and 6 wherein each end plate comprises a plurality of end plate segments 228 or 328 may be preferable. These embodiments result in less material waste and are easier to assemble.

In the embodiment of FIG. 4, end plate segments are joined together in polar regions 240 and 241 of the end plates. By overlapping the end plate segment laminations, azimuthal current is provided in the end plate segment laminations. As shown in FIG. 5, each end plate may comprises a plurality of alternately overlapping end plate laminations 242, 243, 244, 245.

In the embodiment of FIG. 6, end plate segments are joined together in span regions 336 of the end plates. Again, alternately overlapping end plate laminations can be used where the span regions are joined.

Figure 7:
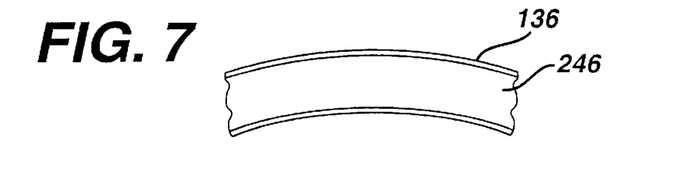
FIG. 7 is an end view of a span region of an end plate and a span support according to another embodiment of the present invention.

FIG. 7 is an end view of a span region of an end plate and a span support to provide mechanical stiffening and strengthening according to another embodiment of the present invention, and FIGS. 8–11 are sectional side views of the embodiment of FIG. 7. Without a span support, for some applications the material of the end plates may not be strong enough, stiff enough, and or creep resistant enough to withstand the combined effects of centrifugal and thermal loadings applications.

In the embodiments of FIGS. 7–11, each end plate 136 includes polar regions 140 and span regions 136 (shown in FIG. 3 for example) and the rotor further includes a non-magnetic span support for each respective end plate. Although one span support 246 shape is shown in FIG. 7 for purposes of example, other shapes can be used. In one embodiment, the span supports comprise a non-magnetic material such as non-magnetic stainless steel for example.

In the embodiments of FIGS. 8–11, the span support comprises a plurality of span supports and more specifically the supports comprise pairs of span supports (246 and 248 in FIG. 8, 346 and 348 in FIG. 9, 446 and 448 in FIG. 10, and 546 and 548 in FIG. 11) positioned on opposing sides of each span region of each end plate.

Figure 8:
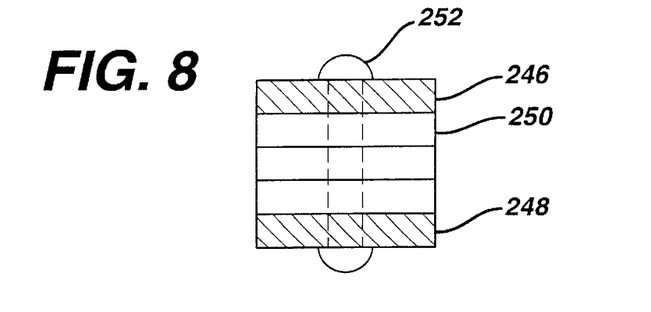
FIGS. 8–11 are sectional side views of the embodiment of FIG. 7.
Figure 9:
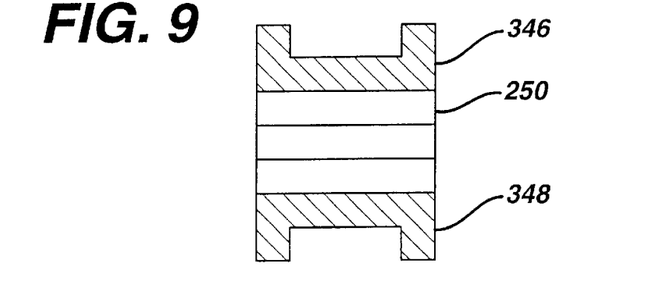
Figure 10:
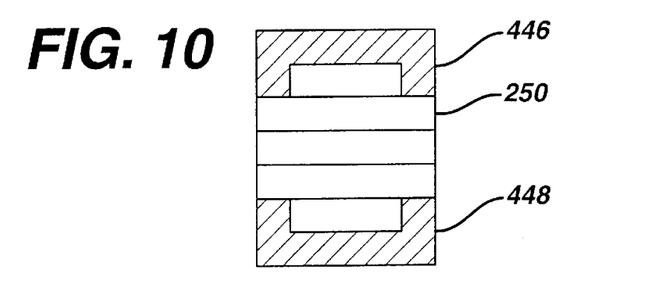
Figure 11:
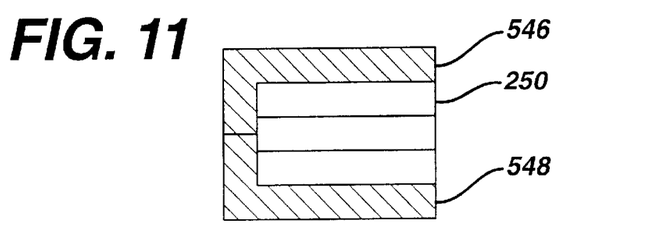

As further shown in FIG. 8, each pair of span supports can be coupled to a respective span region (shown by span region laminations 250) by at least one of a rivet 252, an explosive bond, and a braze, for example.

Figure 12:
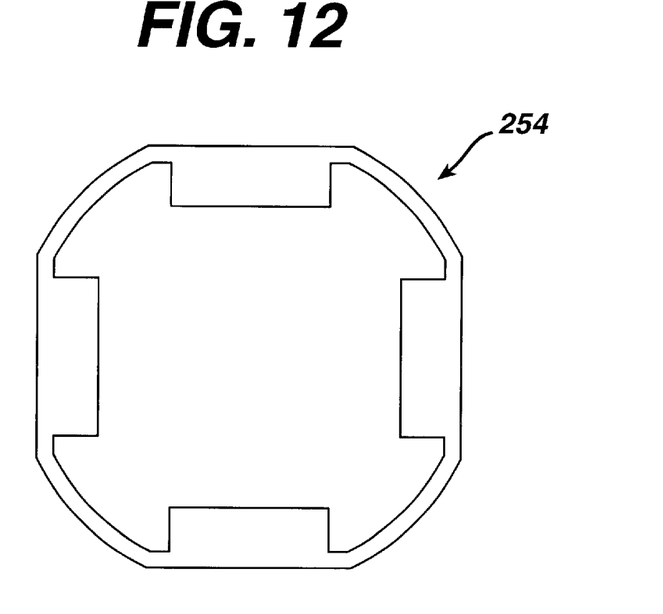
FIGS. 12–14 are end views of span supports according to several other embodiments of the present invention.
Figure 13:
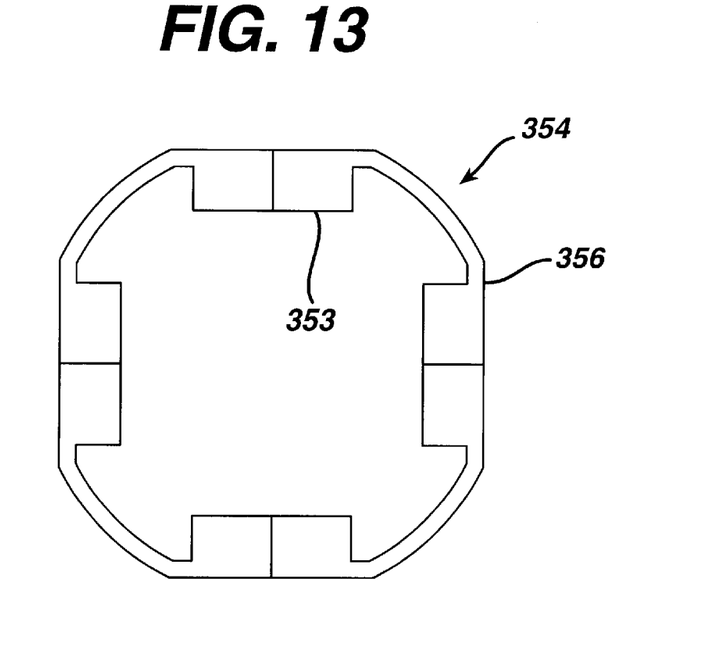
Figure 14:
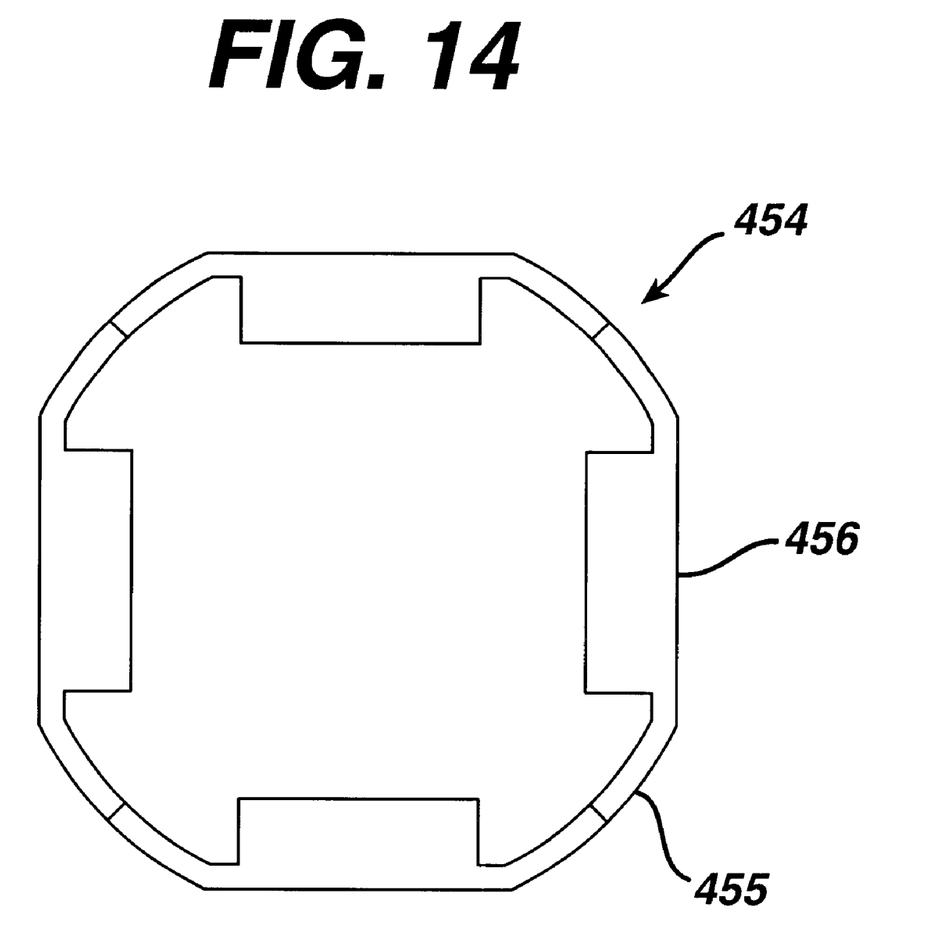

FIGS. 12–14 are end views of span supports according to several other embodiments of the present invention. In some applications additional support of the span regions of the end plates can be mechanically advantageous.

In the embodiments of FIGS. 12–14, span supports 254, 354, or 454 each extend continuously around the rotor shaft (shown as 18 in FIG. 1) and proximately to the respective end plate in at least the span regions of the respective end plate (shown in FIGS. 3, 4, and 6).

Similarly as discussed above with respect to the end plates, each span support may comprise one or more integral laminations 254 (FIG. 12) or a plurality of span support segments 356 (FIG. 13) or 456 (FIG. 14). Likewise, when span support segments are used, the span support segments can be joined together in polar regions 353 of the span supports (FIG. 13) or in span regions 455 of the span supports (FIG. 14), and each span support may comprise a plurality of alternately overlapping span support laminations. In one embodiment, the span support laminations comprise non-magnetic stainless steel, for example.

Figure 15:
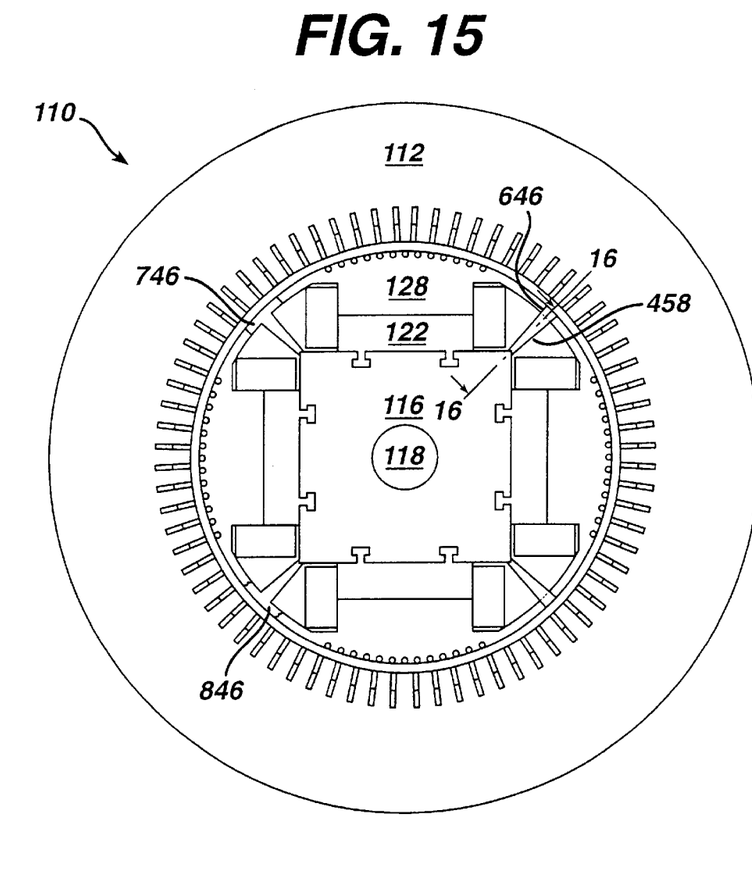
FIG. 15 is an end view of a machine wherein the span supports include a plurality of struts.
Figure 16:
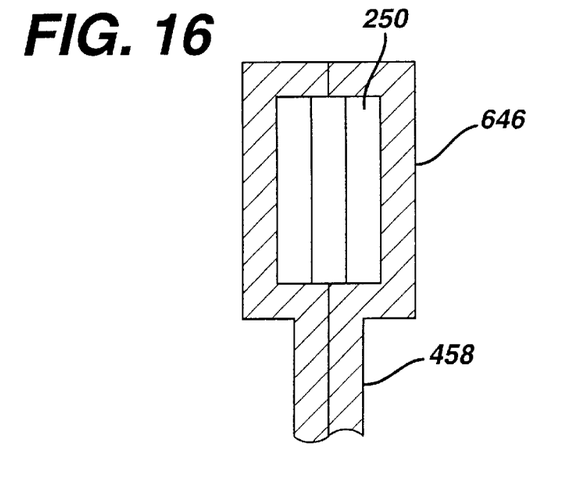
FIG. 16 is a sectional side view along line 16—16 of FIG. 15.

FIG. 15 is an end view of a machine wherein the span supports include a plurality of struts 458, and FIG. 16 is a sectional side view along a portion of line 16—16 of FIG. 15. In one embodiment the struts are riveted to rotor core 116. The struts can be the same thickness as the span supports as shown by span support 646, or thinner than the span supports as shown by span support 746. Additionally struts can also be used in combination with larger span supports such as those described with respect to FIGS. 12–14 as shown by the broken lines of span support 846. The struts may comprise a non-magnetic structurally appropriate material. In one embodiment, the struts extend from the rotor core in a manner similar to rotor winding brackets (not shown).

Even when end plates extend continuously around the rotor shaft, some harmonic flux can still penetrate into rotor windings 17 and rotor core 16 (FIG. 1) and can still create potentially harmful consequences. Additional shielding of the rotor core and windings is provided by having rotor bars extend through rotor bar holes in both the polar regions of the end plates and the span regions of the end plates rather than in only the polar regions of the end plates. For structural integrity, additional mechanical support of the rotor bars is useful.

Figure 17:
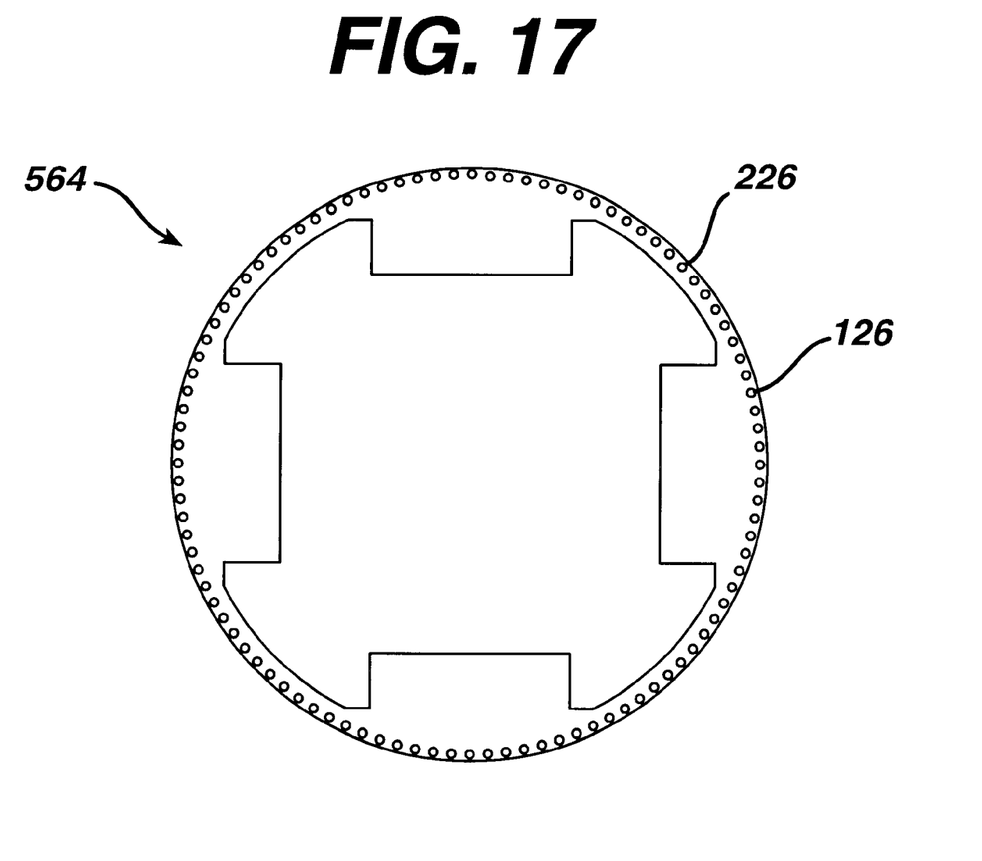
FIG. 17 is an end view of a stiffener lamination according to another embodiment of the present invention.
Figure 18:
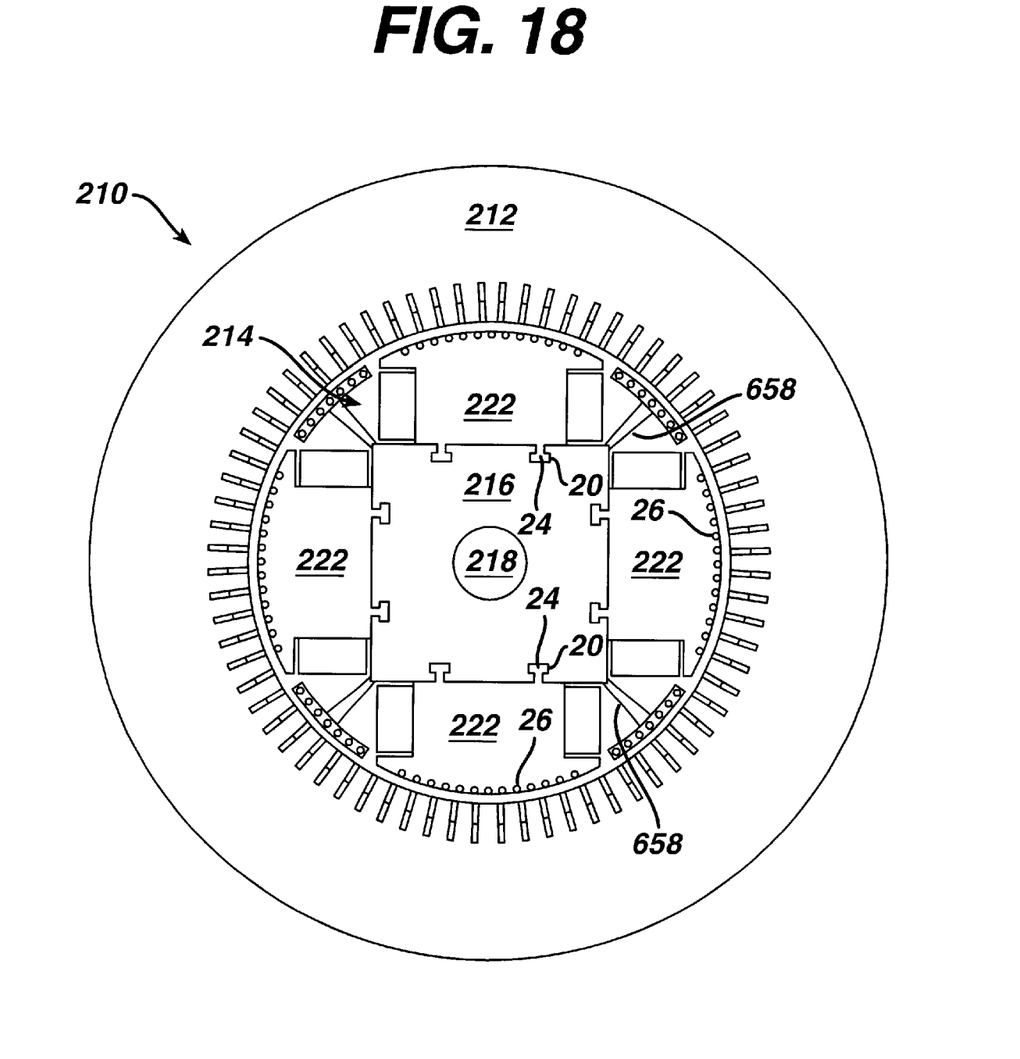
FIG. 18 is an end view of a machine having struts and a full rotor cage according to another embodiment of the present invention.

FIG. 17 is an end view of stiffener lamination 564 according to another embodiment of the present invention wherein stiffener laminations 564 are situated at intervals along the salient poles to support the rotor bars that are situated between the salient poles. FIG. 18 is an end view of a machine 210 having struts 658 and a full rotor cage according to another embodiment of the present invention. Like the stiffener laminations of FIG. 17, struts 658 can be situated at intervals along the rotor salient poles. Again, rotor winding brackets (not shown) can be used to mount the stiffener laminations or struts.

Figure 19:
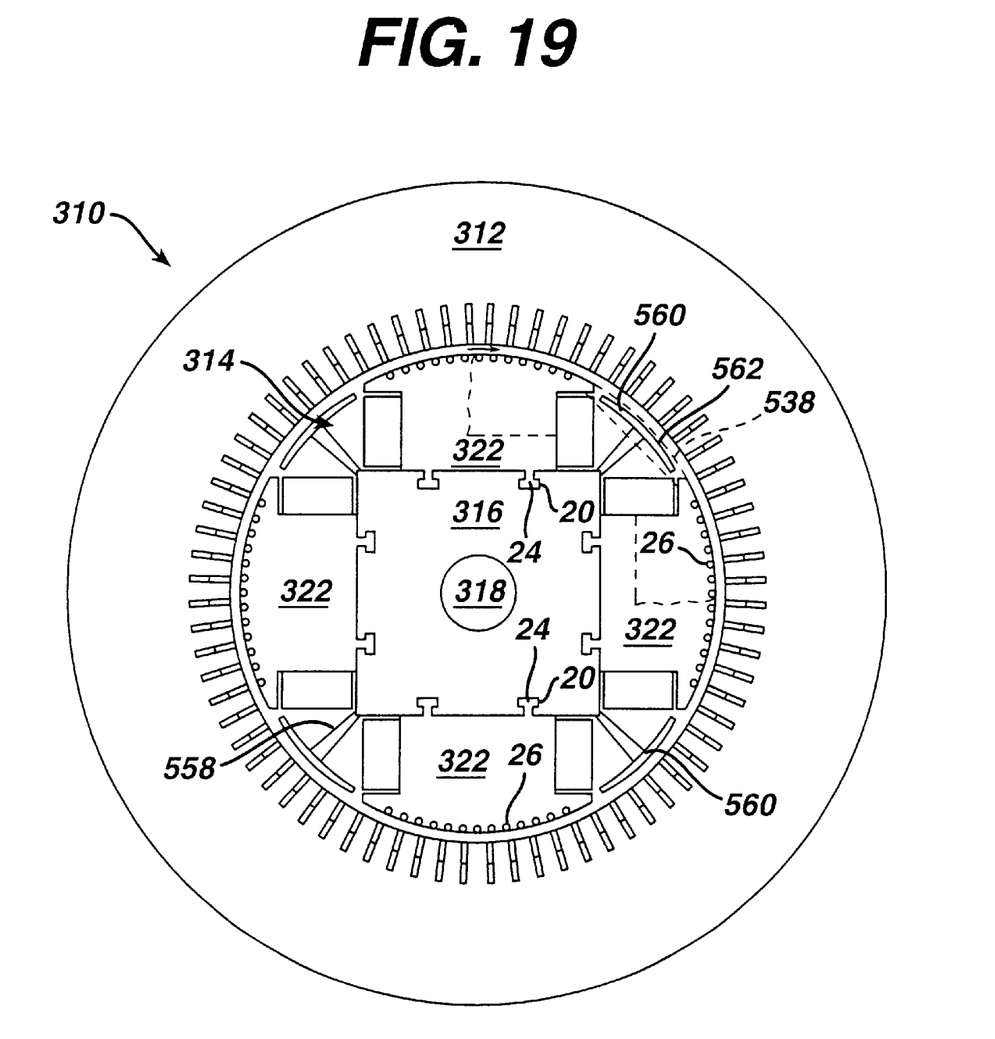
FIG. 19 is an end view of a machine having struts supporting conductive sheets in the span portions between the poles according to another embodiment of the present invention.

FIG. 19 is an end view of a machine 310 having struts 558 supporting conductive sheets 560 in the span portions between the poles according to another embodiment of the present invention. Recognizing that the main machine flux is not supported in the span regions of the rotor, in this embodiment, rotor bars extend through polar regions of the rotor whereas solid conductive sheets 560 extend between polar regions of the rotor (so long as adequate ventilation is still achievable). In a similar manner as discussed above, stiffener laminations (not shown in FIG. 19, but shown in FIG. 17) and/or struts 458 can be used. In one embodiment, end plates (shown schematically by 538) include slits 562 for receiving the conductive sheets, and the conductive sheets are brazed to the end plates.

Figure 20:
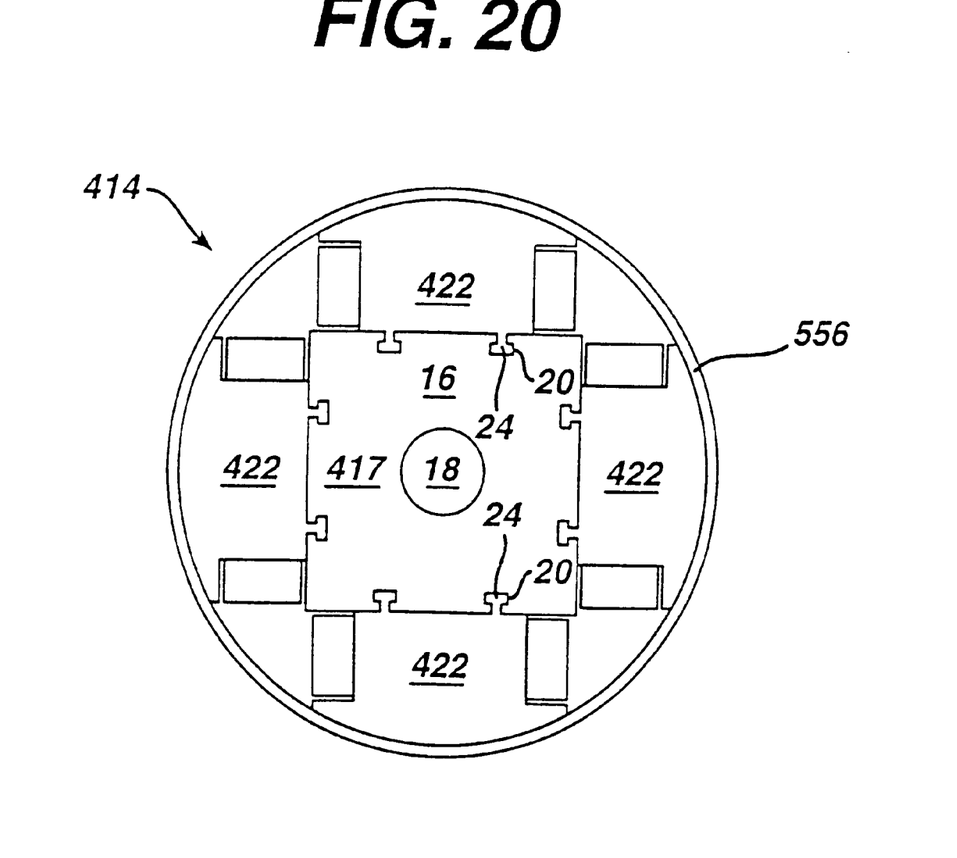
FIG. 20 is an end view of a rotor including an outer conductive shell connected to end plates according to another embodiment of the present invention.
Figure 21:
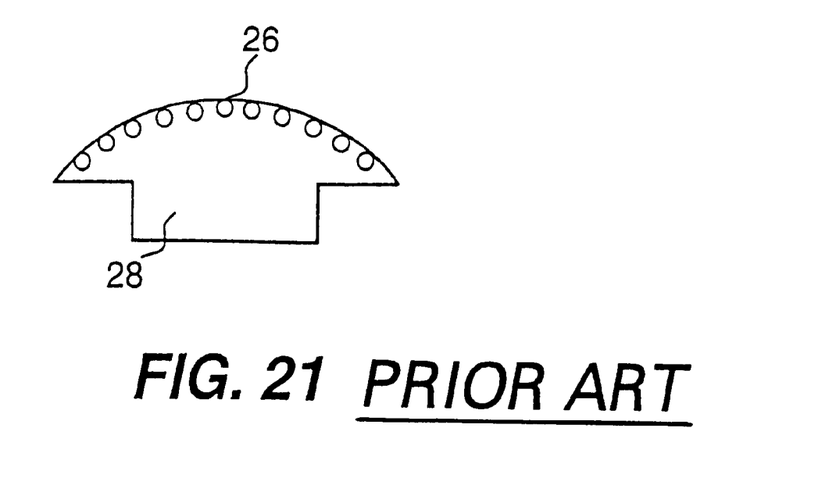
FIG. 21 is an end view of an end plate segment.

FIG. 20 is an end view of a rotor according to another embodiment of the present invention wherein rotor 414 includes a rotor shell 566 encasing poles 422. In this embodiment, no rotor bars or bar holes are needed. Stiffener laminations or struts (not shown) can be used to increase mechanical stability. The end plates can serve as "caps" to provide a connection for induced currents to return to the poles. Without such end plates, induced currents will concentrate at the edges of the shell and cause the edges of the shell to become extremely hot. The end plates may comprise material separate from that of rotor shell 566. Alternatively, an end plate may comprise a folded-over portion of rotor shell 566, for example. Although a separate rotor core and rotor shaft are shown in FIGS. 1, 15, 18, and 19, in some embodiments, a rotor shaft and rotor core are an integral unit, shown for purposes of example in FIG. 20 as rotor shaft 417. While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A salient pole synchronous machine rotor comprising:
    a rotor shaft;
    a plurality of salient poles concentric to the rotor shaft;
    electrically conductive end plates facing opposing ends of the salient poles, each end plate extending continuously around the rotor shaft and including polar regions and span regions, wherein the polar regions have a larger cross-sectional area than that of the span regions.

2. The rotor of claim 1 wherein each end plate comprises a plurality of end plate segments.

3. The rotor of claim 1 wherein the rotor further includes a non-magnetic span support for each respective end plate.

4. The rotor of claim 3 wherein the span support comprises a plurality of span supports.

5. The rotor of claim 4 wherein the span supports comprise pairs of span supports positioned on opposing sides of each span region of each end plate.

6. The rotor of claim 5 wherein each pair of span supports is coupled to a respective span region by at least one of a rivet, an explosive bond, and a braze.

7. The rotor of claim 3 wherein the span support extends continuously around the rotor shaft and proximately to the respective end plate in at least the span regions of the respective end plate.

8. The rotor of claim 7 wherein each span support comprises a plurality of span support segments.

9. The rotor of claim 8 wherein span support segments are joined together in polar regions of the span supports.

10. The rotor of claim 8 wherein span support segments are joined together in span regions of the span supports.

11. The rotor of claim 8 wherein each span support comprises a plurality of alternately overlapping span support laminations.

12. The rotor of claim 3 wherein the span support includes a plurality of struts.

13. The rotor of claim 1 wherein the rotor further includes rotor bars extending through rotor bar holes in the polar regions of the end plates and the span regions of the end plates.

14. The rotor of claim 13 further including stiffener laminations situated at intervals along the salient poles to support the rotor bars that are situated between the salient poles.

15. The rotor of claim 13 further including struts situated at intervals along the salient poles to support the rotor bars that are situated between the salient poles.

16. The rotor of claim 1 further including rotor bars extending through polar regions of the rotor and conductive sheets extending between polar regions of the rotor.

17. The rotor of claim 16 wherein the end plates include slits for receiving the conductive sheets.

18. The rotor of claim 1 further including a rotor shell encasing the polar regions.

19. A salient pole synchronous machine rotor comprising:
a rotor shaft;
a plurality of salient poles concentric to the rotor shaft;
a plurality of rotor bars situated within the salient poles;
end plates facing opposing ends of the salient poles, each end plate extending continuously around the rotor shaft, being electrically coupled to the rotor bars, comprising a plurality of end plate segments, and including polar regions and span regions, wherein the polar regions have a larger cross-sectional area than that of the span regions; and
a non-magnetic span support for each respective end plate.

20. The rotor of claim 19 wherein the span support comprises pairs of span supports positioned on opposing sides of each span region of each end plate.

21. The rotor of claim 19 wherein the span support extends continuously around the rotor shaft and proximately to the respective end plate in at least the span regions of the respective end plate.

22. The rotor of claim 21 wherein each span support comprises a plurality of span support segments.

23. The rotor of claim 19 wherein the span support includes a plurality of struts.

24. The rotor of claim 19 wherein the rotor further includes rotor bars extending through rotor bar holes in the polar regions of the end plates and the span regions of the end plates.

25. A salient pole synchronous machine rotor comprising:
a rotor shaft;
a plurality of salient poles concentric to the rotor shaft;
end plates facing opposing ends of the salient poles, each end plate extending continuously around the rotor shaft and comprising a plurality of end plate segments are joined together in polar regions of the end plates.

26. A salient pole synchronous machine rotor comprising:
a rotor shaft;
a plurality of salient poles concentric to the rotor shaft;
end plates facing opposing ends of the salient poles, each end plate extending continuously around the rotor shaft and comprising a plurality of end plate segments are joined together in span regions of the end plates.

27. A salient pole synchronous machine rotor comprising:
a rotor shaft;
a plurality of salient poles concentric to the rotor shaft;
end plates facing opposing ends of the salient poles, each end plate extending continuously around the rotor shaft, comprising a plurality of end plate segments, and comprising a plurality of alternately overlapping end plate laminations.

* * * * *